( 12 ) United States Patent
Zhai

(10) Patent No.: US 10,372,328 B2
(45) Date of Patent: *Aug. 6, 2019

(54) INTELLIGENT TOUCHSCREEN KEYBOARD WITH FINGER DIFFERENTIATION

(71) Applicant: Google LLC, Mountain View, CA (US)

(72) Inventor: Shumin Zhai, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,928

(22) Filed: Sep. 19, 2016

(65) Prior Publication Data

US 2017/0003878 A1    Jan. 5, 2017

Related U.S. Application Data

(63) Continuation of application No. 13/736,341, filed on Jan. 8, 2013, now Pat. No. 9,448,651.

(60) Provisional application No. 61/584,587, filed on Jan. 9, 2012.

(51) Int. Cl.
G06F 3/0488    (2013.01)
G06F 3/041    (2006.01)
G06F 3/02    (2006.01)

(52) U.S. Cl.
CPC ............ *G06F 3/04886* (2013.01); *G06F 3/02* (2013.01); *G06F 3/041* (2013.01); *G06F 3/0412* (2013.01); *G06F 3/0416* (2013.01)

(58) Field of Classification Search
CPC ........ G06F 3/041–048; G06K 9/00087; G06K 9/52; G06K 9/00073; G06K 9/00389; G06K 9/6277; G06K 9/00114; G06K 9/00107; G06K 9/00885; G06K 9/6292

See application file for complete search history.

(56) References Cited

U.S. PATENT DOCUMENTS

| 5,856,824 | A | 1/1999 | Shieh | |
|---|---|---|---|---|
| 8,665,226 | B2 * | 3/2014 | Liu | G06F 3/044 345/173 |
| 2002/0181747 | A1 | 12/2002 | Topping | |
| 2003/0048260 | A1 * | 3/2003 | Matusis | G06F 3/0233 345/173 |
| 2003/0146899 | A1 * | 8/2003 | Sakurai | G06F 3/03547 345/156 |
| 2005/0169527 | A1 | 8/2005 | Longe et al. | |

(Continued)

FOREIGN PATENT DOCUMENTS

EP    0817000    1/1998

OTHER PUBLICATIONS

Authorized Officer Lee W. Young, International Search Report and Written Opinion in International Application No. PCT/US2013/020619, dated Mar. 26, 2013, 12 pages.

(Continued)

*Primary Examiner* — Sanjiv D. Patel
(74) *Attorney, Agent, or Firm* — Fish & Richardson P.C.

(57) ABSTRACT

Implementations of the present disclosure include actions of displaying a plurality of keys on a touchscreen of a computing device, receiving user input to the touchscreen, the user input including a contact with the touchscreen, in response to receiving the user input, determining spatial information associated with the contact and generating an image of the contact, determining an output based on the image and the spatial information, and executing the output.

18 Claims, 5 Drawing Sheets

(56) References Cited

U.S. PATENT DOCUMENTS

| | | |
|---|---|---|
| 2005/0249387 A1 | 11/2005 | Machida |
| 2008/0165160 A1 | 7/2008 | Kocienda et al. |
| 2009/0146957 A1 | 6/2009 | Lee et al. |
| 2009/0287999 A1* | 11/2009 | Ooi .................... G06F 3/03547 715/702 |
| 2010/0039393 A1 | 2/2010 | Pratt et al. |
| 2010/0079413 A1 | 4/2010 | Kawashima |
| 2010/0127995 A1* | 5/2010 | Rigazio ................ G06F 3/0418 345/173 |
| 2010/0153313 A1 | 6/2010 | Baldwin et al. |
| 2010/0228539 A1* | 9/2010 | Slocum .............. G06F 3/04886 704/9 |
| 2010/0265204 A1* | 10/2010 | Tsuda .................... G06F 1/1626 345/174 |
| 2011/0050576 A1* | 3/2011 | Forutanpour ......... G06F 3/0488 345/168 |
| 2011/0086674 A1* | 4/2011 | Rider .................... G06F 3/0416 455/566 |
| 2011/0102334 A1 | 5/2011 | Colley et al. |
| 2012/0206416 A1 | 8/2012 | Ilmonen |
| 2013/0067382 A1* | 3/2013 | Townsend ........... G06F 3/04895 715/773 |
| 2013/0120278 A1* | 5/2013 | Cantrell .............. G06F 3/04886 345/173 |
| 2013/0201155 A1* | 8/2013 | Wu .................... G06F 3/03547 345/174 |

OTHER PUBLICATIONS

Per-Ola Kristensson et al., "SHARK2: A Large Vocabulary Shorthand Writing System for Pen-based Computers," Proceedings of the ACM Symposium on User Interface Software and Technology (UIST 2004), Oct. 24-27, 2004, Santa Fe, New Mexico, CHI Letters vol. 6, Issue 2, pp. 43-52.

William E. Cooper (ed), "Cognitive Aspects of Skilled Typewriting," Springer-Verlag, New York, 1982, entire book.

Davide Maltoni et al., "Handbook of Fingerprint Recognition," Second Edition, Springer, New York, 2009, entire book.

Jefferson Y. Han, "Low-Cost Multi-Touch Sensing Through Frustrated Total Internal reflection," Proceedings of the 18th Annual ACM Symposium on User Interface Software and Technology (UIST '05), Oct. 23-27, 2007, Seattle, Washington, 2005 ACM, pp. 115-118.

Fujitsu Microelectronics Europe GmbH, Capacitive Touch Sensors: Application fields, technology overview and implementation example, Jan. 12, 2010, Langen, Germany, 12 pages.

Anil K. Jain et al., "Filterbank-Based Fingerprint Matching," IEEE Transactions on Image Processing, vol. 9, No. 5, pp. 846-859, May 2000.

Anil K. Jain et al., "FingerCode: A Filterbank for Fingerprint Representation and Matching," Computer Vision and Pattern Recognition, IEEE Computer Society Conference on Computer Vision and Pattern Recognition, Fort Collins, Colorado, vol. 2, Jun. 1999, 8 pages.

Anil K. Jain et al., "Fingerprint Matching Using Minutiae and Texture Features," Proceedings of the International Conference on Image Processing (ICIP), Oct. 7-10, 2001, Thessaloniki, Greece, vol. 3, pp. 282-285.

Tom M. Mitchell, "Machine Learning," The McGraw-Hill Companies, Inc., 1997, entire book.

Nei Kato et al., "A Handwritten Character Recognition System Using Directional Element Feature and Asymmetric Mahalanobis Distance," IEEE Transactions on Pattern Analysis and Machine Intelligence, vol. 21, Issue 3, Mar. 1999, pp. 258-262.

Wu Xiangqian et al., "Fuzzy Directional Element Energy Feature (FDEEF) Based Palmprint Identification," Proceedings of the 16th International Conference on Pattern Recognition (ICPR'02), vol. 1, 2002, pp. 95-98.

Extended European Search Report issued in European Application No. 13735965.9 dated Sep. 4, 2015, 10 pages.

Office Action in European Application No. 13735965.9-1507, dated Aug. 26, 2016, 7 pages.

Office Action in Chinese Application No. 201380009780.9, dated Jan. 24, 2017, 4 pages (English translation).

Office Action in Chinese Application No. 201380009780.9, dated Jul. 4, 2016, 11 pages (English translation).

International Preliminary Report on Patentability issued in International Application No. PCT/US2013/20619, dated Jul. 15, 2014, 6 pages.

* cited by examiner

INTELLIGENT TOUCHSCREEN KEYBOARD WITH FINGER DIFFERENTIATION

CROSS-REFERENCE TO RELATED APPLICATION

This application is a continuation of U.S. patent application Ser. No. 13/736,341 filed on Jan. 8, 2013, which claims the benefit and priority of U.S. Provisional Application No. 61/584,587, filed Jan. 9, 2012, the disclosure of which is expressly incorporated herein by reference in the entirety.

BACKGROUND

Computing devices, such as mobile computing devices, include input means for users to provide input. In some scenarios, users can provide input through touch typing, which can be a fast and effective method of text entry into computing devices. For example, touch typing can be used to write electronic messages, program code, input search queries, write chat messages, and blogging. However, touch typing is generally performed using a physical keyboard or keypad, tend to take up valuable space, particularly in mobile computing devices. Consequently, some computing devices include touchscreen displays, through which users are able to provide input to the computing device.

SUMMARY

In general, innovative aspects of the subject matter described in this specification may be embodied in methods that include the actions of displaying a plurality of keys on a touchscreen, receiving user input to the touchscreen, the user input including a contact with the touchscreen, in response to receiving the user input, determining spatial information associated with the contact and generating an image of the contact, determining an output based on the image and the spatial information, and executing the output. Other implementations of this aspect include corresponding systems, apparatus, and computer programs, configured to perform the actions of the methods, encoded on computer storage devices.

These and other implementations may each optionally include one or more of the following features. For instance, the touchscreen is configurable to display a touchscreen keyboard, the touchscreen keyboard including a plurality of keys; the spatial information includes a position of the image; actions further include generating a plurality of probability distributions and determining the output based on the probability distributions; each probability distribution is associated with one or both of a key of the plurality of keys and a finger of the user; each probability distribution is based on one or both of features of the image and the position of the image; determining an output includes selecting a key of the plurality of keys based on the probability distributions, the output corresponding to the key; the image is generated using one or more technologies including surface acoustic wave sensing, capacitive sensing, infrared sensing, and optical sensing; actions further include generating one or more finger models, each of the one or more finger models being based on at least one image; the one or more finger models correspond to a particular user; actions further include classifying the image using one or more classification schemes, the classifications schemes including image-based classification and feature-based classification; actions further include classifying the image based on determining the position of the contact; actions further include classifying the image by comparing the image to the one or more finger models; actions further include updating one of the plurality of finger models based on the image; actions further include storing the image; actions further include determining that the contact is a tap; actions further include executing the output by one or more of performing a function and displaying a character on the touchscreen.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Implementations of the present disclosure are generally directed systems and methods for determining input intent of a user using a touchscreen interface (e.g., a touchscreen keyboard). In some implementations, when a user contacts the touchscreen of a device with one or more fingers, the device can generate one or more associated finger contact images and compares the images to finger models stored on the device. The comparison can enable the device to, for example, estimate a set of finger probabilities. In some examples, a finger probability can include the probability that a particular finger was the finger that contacted the touchscreen. The finger probabilities can be converted to a set of character probabilities by assuming a particular finger-to-keyboard assignment. Further integrating the set of character probabilities with character probabilities obtained from a statistical keyboard geometry model can enable the device to determine a most likely character intended by the finger contact. The most likely character can be selected and can be displayed on the touchscreen. In this manner, the precision with which a user enters text and/or commands on a touchscreen surface can be relaxed. This significantly improves the user's ability to quickly and accurately input text into a device, as well as the overall usability of the device.

Figure 1:
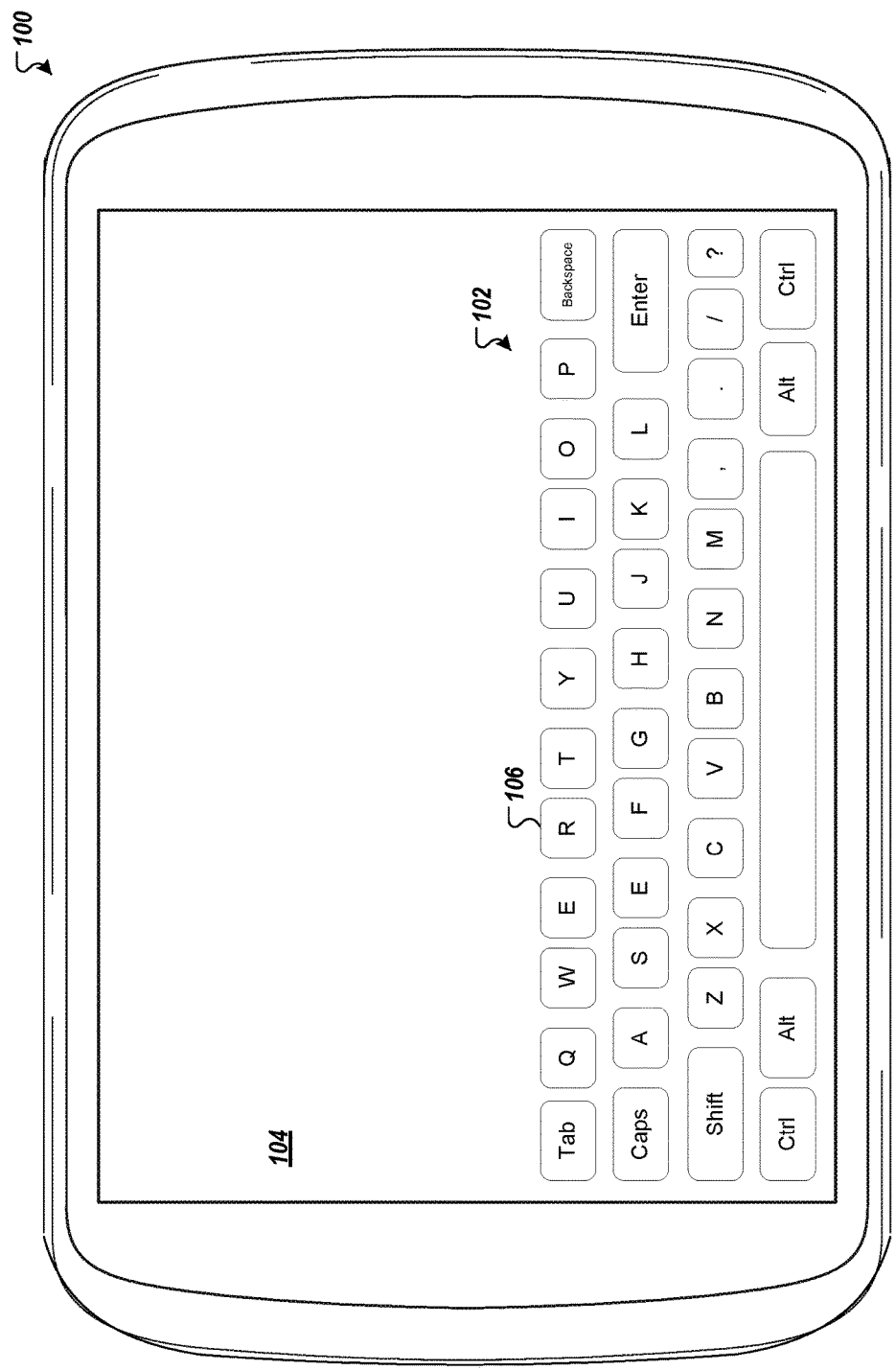
FIG. 1 depicts an example computing device including a touchscreen keyboard displayed on a touchscreen of the computing device.

FIG. 1 depicts an example computing device 100 including a touchscreen keyboard 102 displayed on a touchscreen 104 of the computing device 100. In the example of FIG. 1, the computing device 100 is a tablet computing device. In some implementations, however, the computing device 100 can be a desktop computer including a touchscreen, a laptop computer including a touchscreen, a personal digital assistant (PDA), a mobile phone including a touchscreen, an interactive wall, an interactive table, or one of many other types of computing devices including a touchscreen.

The touchscreen 104 is responsive to contact (e.g., to the force exerted on the touchscreen 104 by a finger), and the responsiveness can be adjusted. The touchscreen 104 is generally displayed within a defined area on a surface of the computing device 100. The touchscreen 104 can also be displayed in one or more orientations including a portrait orientation and a landscape orientation. In a particular orientation, the aspect ratio of the touchscreen 104 may be varied to alter the length of the touchscreen 104 relative to the height of the touchscreen 104. The touchscreen 104 can simultaneously display one or more of the touchscreen keyboard 102 and one or more other images that can include characters or other graphical representations of outputs of the touchscreen keyboard 102.

The touchscreen keyboard 102 of FIG. 1 is displayed within a lower region (relative to the orientation depicted in FIG. 1) of the touchscreen 104; however, the touchscreen keyboard 102 can generally be displayed within any region of the touchscreen 104. The touchscreen keyboard 102 can be displayed across the entire touchscreen 104, or can be displayed within a portion of the touchscreen 104. The touchscreen keyboard 102 can be displayed in one or more keyboard layouts. Example keyboard layouts can include QWERTY layouts for Latin scripts, QWERTY layouts for non-Latin scripts, non-QWERTY layouts for Latin scripts, and non-QWERTY layouts for non-Latin scripts. In some examples, the font style and font size of the character labels on the touchscreen keyboard character keys 106 can be changed. The response of a touchscreen character key 106 to a finger contact may be a generated character output displayed on the touchscreen 104, deletion of one or more characters displayed on the touchscreen 104, or execution of a program command.

Figure 2:
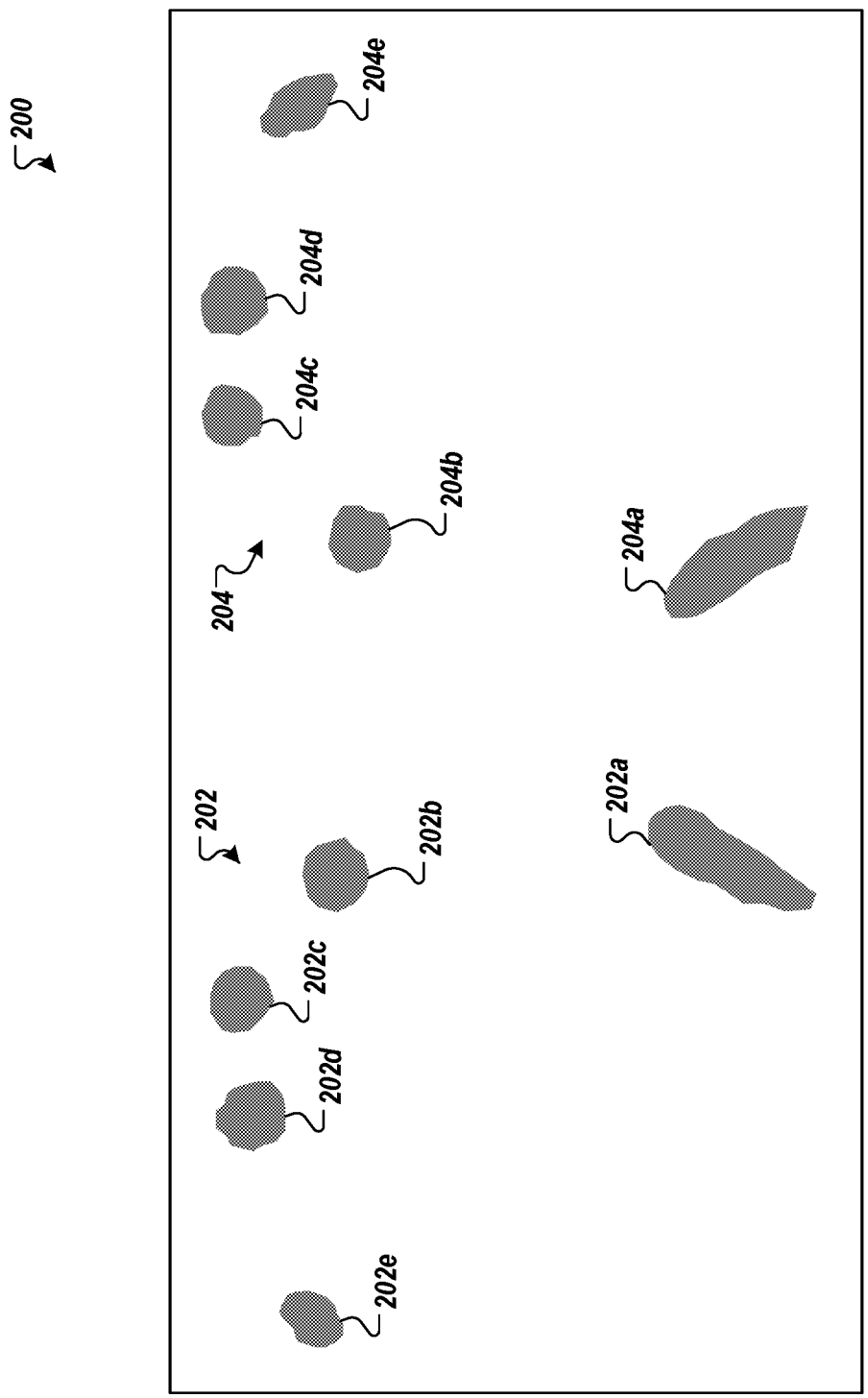
FIG. 2 depicts a representation of an example set of finger contact images generated from finger contacts to a touchscreen.

FIG. 2 depicts a representation of an example set of finger contact images 200 generated from finger contacts to a touchscreen (e.g., the touchscreen 104 of FIG. 1). As used herein, the term finger includes a digit of the human hand (i.e., a fingers or a thumb). Left hand finger contact images 202 include a left thumb contact image 202a, a left index finger contact image 202b, a left middle finger contact image 202c, a left ring finger contact image 202d, and a left little finger contact image 202e. Right hand finger contact images 204 include a right thumb contact image 204a, a right index finger contact image 204b, a right middle finger contact image 204c, a right ring finger contact image 204d, and a right little finger contact image 204e. An image of one or more finger contacts 202a-202e, 204a-204e can be generated in response to contact between one or more fingers and the touchscreen. Images 202a-202e, 204a-204e of one or more finger contacts can be generated upon one or more fingers contacting the touchscreen keyboard, for example, and/or a different region of the touchscreen that might not be currently displaying a touchscreen keyboard.

Various touch sensing technologies can be used to generate finger contact images, including surface acoustic wave (SAW) technology, capacitive sensing, infrared sensing, and optical sensing. It is contemplated that one or more of the touch sensing technologies discussed herein can be used to generate one or more finger contact images. In some implementations, the finger contact images can be characterized by one or more features including an image texture, intensity, image contour, orientation of a major image axis, and information based on an image area.

In some examples, resistive sensing can be used with touchscreens that include electrically conductive layers separated by a narrow gap. When an object, such as a finger, applies a force to a touchscreen by pressing down on the touchscreen 104, the electrically conductive layers contact one another, causing the touchscreen 104 to behave as a pair of voltage dividers with a connected output. This connection causes a change in the electrical current, which is registered as a contact to a given point of the touchscreen. The change in the electric current can be processed by a controller to generate one or more images representing finger contact with the touchscreen (e.g., one or more of images 202a-202e, 204a-204e).

In some examples, SAW technology uses ultrasonic waves that travel over the touchscreen. When the touchscreen 104 is contacted, a portion of the ultrasonic waves is absorbed. The resulting changes in the ultrasonic waves locates the position of the contact. This information can be processed by a controller to generate one or more images representing finger contact with the touchscreen (e.g., one or more of images 202a-202e, 204a-204e).

In some examples, capacitive sensing can be used with touchscreens that include a capacitive touch sensor having an array of micro-capacitors. In some examples, states of the micro-capacitors can be affected by a contact to the touchscreen. A contact to the touchscreen distorts the electrostatic field of the touchscreen, which locates the position of the contact. This distortion can be processed by a controller to generate one or more images representing finger contact with the touchscreen (e.g., one or more of images 202a-202e, 204a-204e).

In some examples, infrared sensing can be used with touchscreens that include an array of infrared LEDs and photo-detector pairs positioned around the edges of the touchscreen. The LED light beams cross each other in vertical and horizontal patterns, which are disrupted by contact to the touchscreen. The disruption locates the position of the contact and is detected by one or more sensors. A controller processes the disruption to generate one or more images representing finger contact with the touchscreen (e.g., one or more of images 202a-202e, 204a-204e).

In some examples, optical sensing can be used with touchscreens that include, for example, LEDs positioned around the edges of the touchscreen and can be based on the phenomenon of Frustrated Total Internal Reflection, where LED light beams that traverse the underside of the touchscreen are completely reflected to a photo-detector upon a contact to the touchscreen. The detection locates the position of the contact, and a controller processes the disruption to generate one or more images representing finger contact with the touchscreen (e.g., one or more of images 202a-202e, 204a-204e).

In some examples, the finger contact images 202a-202e, 204a-204e can include ridges and valleys that form patterns unique to each of the fingers contacting the touchscreen. For each finger contact image 202a-202e, 204a-204e, a probability of that image 202a-202e, 204a-204e belonging to each of the 10 fingers can be estimated. Each image 202a-202e, 204a-204e is classified as one of each of the 10 fingers using finger differentiation. In some examples, finger differentiation relies on a set of probability values, or finger models, that are assigned to each of the fingers generating finger contact images 202a-202e, 204a-204e. This set of probabilities can provide useful information when combined with other sources of typing signals. In some examples, other resources of typing signals can include a finger contact position on a graphical keyboard, a language model (e.g., a letter-level N-gram model or a word-level N-gram model), or a lexicon of words that limits the number of permissible letter permutations. In some implementations, the finger models can be based on one or more parameters including an image area, an orientation of a major image axis, and an image intensity map. In some examples, the finger models can be continuously updated for an individual user.

Once an image 202a-202e, 204a-204e of the contact is generated, the image 202a-202e, 204a-204e is filtered to remove noise, is analyzed, is preprocessed, and is read into a matrix.

In some implementations, finger models can be generated through an optional registration process and continuously trained with recognized finger contact images 202a-202e, 204a-204e that are not immediately erased by the user. During the registration process, a user can be prompted to rest all ten fingers on the screen, and all ten finger contact images 202a-202e, 204a-204e can be generated. In some implementations, the user can rest all 10 fingers on the touchscreen simultaneously. In some examples, this process can be repeated one or more times. In some implementations, the user can rest less than 10 fingers on the touchscreen simultaneously and then sequentially rest any remaining fingers on the touchscreen in groups of one or more fingers at a time until all 10 finger contact images 202a-202e, 204a-204e have been generated. In some examples, this process can be repeated one or more times. In some examples, the registration process can occur at the first instance of the user typing on the touchscreen. In some examples, the registration process can occur prior to each typing session. In this case, the user habitually rests all 10 fingers on the keyboard before beginning to type, and the computing device 100 can recognize this input pattern as a registration process. In some examples, the user can register less than 10 fingers.

The location of each finger contact image 202a-202d, 204a-204e relative to finger contact image 202e determines an associated finger label corresponding to finger contact images 202d, 202c, 202b, 202a, 204a, 204b, 204c, 204d, and 204e, respectively, where the first finger corresponds to finger contact image 202e.

In some implementations, a registration process can be foregone. In some examples, the finger models can be initialized with neutral values and flagged so that the next series of one or more finger contact images 202a-202e, 204a-204e can be used for finger model generation (until all 10 finger models have been generated).

In some implementations, a finger model is an aggregated model that can include information aggregated over the history of a user typing on the touchscreen, where a newly generated finger contact image 202a-202e, 204a-204e is used to update the aggregated model. When aggregating, a weight assigned to the new image is set such that it is neither too high (to avoid error) nor too low (so that the model can update quickly). In order to reduce the probability of error occurring in the model, a set of exception rules can be applied to the new finger contact image 202a-202e, 204a-204e before the model is updated. For example, if the new finger contact image 202a-202e, 204a-204e is very different from the finger contact images 202a-202e, 204a-204e included within the current model, the new image 202a-202e, 204a-204e will be placed on hold until several additional images 202a-202e, 204a-204e are acquired that are sufficiently similar to the new image 202a-202e, 204a-204e and to one another. In some cases, the new finger contact images 202a-202e, 204a-204e may be very different from the finger contact images 202a-202e, 204a-204e in the current model if a different user uses the computing device 100. If these additional images 202a-202e, 204a-204e are not similar to one another, they can be discarded. If these new finger contact images 202a-202e, 204a-204e are similar to one another, a new finger model can be generated based on these new images 202a-202e, 204a-204e, and the old model can be discarded.

In some implementations, the finger models can include sub-models. In some examples, each sub-model is based on a single image 202a-202e, 204a-204e input. A series of sub-models forms a queue such that, when a new finger contact image 202a-202e, 204a-204e is considered against a finger model, it can be compared against all sub-models within the queue and receive a total similarity score. A total similarity score can be determined and can quantify a similarity between the new image 202a-202e, 204a-204e and a finger model. In some examples, the total similarity score can be based on a weighted average of all scores between the new image 202a-202e, 204a-204e and each of the sub-models. In some examples, the highest matching score resulting from comparison of the new finger contact image 202a-202e, 204a-204e to each of the sub-models is taken as the measure of total similarity. In some examples, the weights of the sub-models can be provided based on how recent a sub-model is (e.g., the more a recent sub-model is, the higher the weight assigned to the sub-model is).

In some implementations, the frequency of updating the finger model can vary. In some examples, an uncorrected (i.e., no weighting or score has been assigned) finger contact image 202a-202e, 204a-204e can be used to update the finger model. In some examples, a subset of finger contact images 202a-202e, 204a-204e can be used to update the finger model.

Various classification schemes can be used to classify finger contact images, including image-based classification and feature-based classification. In some examples, a combination of one or more classification schemes can be used to classify finger contact images. Representation of the finger models can be based on the specific classification method used. In some examples, if the classification scheme is image-based, the finger models can be represented by images 202a-202e, 204a-204e. In some examples, if the classification scheme is feature-based, the finger models can be represented by sets of features and parameters.

In some implementations, image-based classification is based on previously generated finger contact images 202a-202e, 204a-204e. A new finger contact image 202a-202e, 204a-204e is matched against existing image-based models of the fingers in order to estimate the probability of the new image 202a-202e, 204a-204e belonging to each of the fingers. Image-based classification can be implemented using a variety of approaches, including Raw Image Matching, Core Image Matching, and Finger Code Image Matching.

In Raw Image Matching, each finger model $F_i$ (i=1-10) contains a set of N sub-models. Each sub-model (j=1-N) is based on a previously acquired image of a given finger (i.e., the jth sub-model of the ith finger). When a new finger contact image 202a-202e, 204a-204e T is generated, the minimum distances between T and each sub-model $F_{i,j}$ are obtained by shifting T horizontally and vertically by a number of pixels relative to $F_{i,j}$. In some examples, the process of determining these minimum distances can be optimized by standard techniques known to those skilled in the relevant art. In some examples, the process of determining these minimum distances can be sped by first aligning the center point of T with the center point of $F_{i,j}$.

A center point can be defined as the center of mass of an image or the center of an image bounding box. In some examples, assigning the correct finger model to the new finger contact image 202a-202e, 204a-204e is most likely to occur when the centers are aligned between T and $F_{i,j}$. Thus, in some examples, the finger model can be assigned by searching only small areas of T and $F_{i,j}$ that surround their center points. The minimum distance obtained by searching these small areas is likely to equal the minimum distance that could be obtained by searching the entire image areas of T and $F_{i,j}$. The distance metric obtained between the images of T and $F_{i,j}$ can be of various forms known to those skilled in the art (e.g., the Euclidean distance, the city block distance, etc.).

In Core Image Matching, the appropriate finger model can be assigned to the new finger contact image 202a-202e, 204a-204e according to core sub-images (regions of the images surrounding the image center points) of the previously acquired images 202a-202e, 204a-204e rather than according to the entirety of the previously acquired images 202a-202e, 204a-204e. In some examples, a core sub-image can be obtained by extracting a center region of N by N pixels from the new finger contact image 202a-202e, 204a-204e, where N is less than the total number of pixels of the new image 202a-202e, 204a-204e, and N is a constant. The minimum distances between T and $F_{i,j}$ can then be determined by shifting $F_{i,j}$ both horizontally and vertically by a number of pixels within the coordinates of T. In some examples, the process of determining these minimum distances can be optimized by standard techniques known to those skilled in the relevant art. In some examples, the process of determining these minimum distances can be sped by first aligning the center point of T with the center point of $F_{i,j}$.

In some examples, because N is less than the total number of pixels of the bounding box, the computation can proceed faster in Core Image Matching than it can in Raw Image Matching. Furthermore, because the core sub-image is located at the center of the finger contact image 202a-202e, 204a-204e, it is less likely to generate error typically associated with matching the edges of the entire image 202a-202e, 204a-204e. On the other hand, the touch image contour information (e.g., edge profiles) might not be captured. To compensate for this, additional features can be considered in determining the minimum distances between T and $F_{i,j}$, such as image contour shape and image area.

In Finger Code Matching, a reference point and a region of interest are identified on the finger contact image 202a-202e, 204a-204e. In some examples, the reference point can be defined as the point of maximum curvature of concave ridges on the image 202a-202e, 204a-204e. In some examples, the region of interest can be defined as a circular area surrounding the reference point. In some examples, the reference point can be based on a set of minutiae points. In some examples, the region of interest can be defined as a rectangle enclosing the set of minutiae points. In some examples, the region of interest can be defined as a fixed center area. For this case, T and $F_{i,j}$ may in general be misaligned; however, this misalignment is minimized because the user of the touchscreen 104 tends to strike the same key with the same finger at a similar approach angle.

In some implementations, using a fixed center area can provide for faster computation than does using a region of interest surrounding a variable reference point.

In some implementations, the region of interest can be allocated into a set of sectors. For example, the region of interest can be allocated into 80 sectors. In some examples, if the region of interest is a circular area surrounding a maximum curvature reference point, the region of interest can be allocated into a set of concentric bands. In some examples, each band can be further allocated into a set of sectors (cells). In some examples, if the region of interest is a rectangular area, the region of interest can be allocated into a set of equally sized smaller rectangular cells.

In some implementations, Finger Code Matching can be performed by filtering the region of interest in different directions using a bank of filters. Example filters can include Gabor filters. For example, the computing device computes the average absolute deviation from the mean of the gray scale value assigned to each sector, providing a finger code feature vector. In some examples, the finger code feature vector of the new finger contact image 202a-202e, 204a-204e and the finger code feature vector of the finger models can then be compared to determine the Euclidean distance between them.

In feature-based classification, a set of features including the area of the finger contact image 202a-202e, 204a-204e, the orientation of the image 202a-202e, 204a-204e, and the shape of the image contour are used to distinguish one finger from another finger. Standard machine learning techniques (e.g., using a linear classifier) known to those skilled in the relevant art are used to train models and classify new finger contact images 202a-202e, 204a-204e. In some examples, Directional Element Feature (DEF)-based classification can be used to classify new finger contact images 202a-202e, 204a-204e and can be especially useful for Chinese and Japanese character recognition.

In some implementations, the probability $p_i$ of T belonging to finger i can be estimated by an example nonlinear function $f$ according to the following example relationship:

$$p_i = f(d_i) \qquad (1)$$

where the distance d is measured between the finger contact image T and the finger models $F_{i,j}$. The nonlinear function $f$ can be one of various forms. In some examples, it can be assumed that a normal distribution for the distance between the new finger contact image 202a-202e, 204a-204e T and the finger models $F_{i,j}$. In this case, the probability of the new image 202a-202e, 204a-204e belonging to finger i can be proportional to a probability $q_i$ that can be determined based on the following example relationship:

$$q_i = \frac{1}{\sqrt{2\pi\sigma^2}} e^{\frac{-d^2}{2\sigma^2}} \qquad (2)$$

The probability that the new image 202a-202e, 204a-204e belongs to each of the fingers adds up to 1; thus, $q_i$ can be normalized to provide the probability $p_i$ based on the following example relationship:

$$p_i = \frac{q_i}{\sum_{i=1}^{10} q_i} \qquad (3)$$

In some implementations, probability distributions of the fingers can be converted to character probability distributions by using an M by N finger-to-character conversion matrix C, where M is the total number of fingers and N is the total number of characters on the touchscreen keyboard 104. Given finger i, C(i,k) defines the conditional probability of character k.

In some implementations, C(i, k) can be initialized and calculated using a standard assignment, for which the standard finger assignment on a QWERTY keyboard layout is assumed. For example, in the standard assignment, the left middle finger (finger 3) can tap on any of letters e, d, or c. Thus, given finger 3, the probability that each of letters e, d, or c has been tapped is ⅓. In the standard assignment, the right index finger (finger 7) can tap on any of letters y, u, h, j, n, or m. Thus, given finger 7, the probability that each of letters y, u, h, j, n, or m has been tapped is ⅙. In some examples, if the keyboard layout is a non-Qwerty layout, then another canonical finger assignment can be applied.

In some implementations, C(i, k) can be initialized and calculated using a uniform assignment, for which there is no assumption of finger assignment to particular touchscreen keyboard keys 106. Thus, C(i, k) can be initialized with values of 1/N, and there is an equal probability that any character has been tapped, regardless of which finger has been detected.

In some implementations, the conversion matrix C can be updated continuously. For example, C can be updated by calculating C(i,k) as the number of times that character k is entered and uncorrected when finger i is detected. Thus, the probability distribution for each character k can be given by the following example relationship:

$$p_k = p_i C(i,k) \quad (4)$$

In some implementations, the probability distribution of each character can be estimated from a statistical keyboard geometry model. In some examples, a Gaussian distribution can be assumed for the finger contact image being dispersed around the center of the key at which the user aims. Given this assumption for the statistical keyboard geometry model, the probability can be estimated for each character being the target character by using Bayes' rule.

In some implementations, the system can have a training phase during which the finger models are trained from known text. For example, the system can train from the user typing a given text at various speeds while immediately correcting any typing errors.

In some implementations, finger contact stroke gestures can be made by substantially sliding the finger on the touchscreen keyboard 102 to invoke program commands. For example, upon a finger lift event, the computing device 100 can determine that a stroke gesture has been made. This determination can be made, for example, by detecting the length of the contact trajectory relative to the size of the touchscreen keyboard character keys 106. When the length passes a set threshold, the contact can be determined to be a stroke gesture. In some examples, a single, straight right to left stroke can be used to invoke an erase command. This means that the user can erase a typing error by sliding a finger anywhere on the touchscreen keyboard 102 for a sufficient length (e.g., a length greater than that of a key width) immediately after a character is typed (i.e., without tapping the Backspace key). Additional commands can be defined as well. In some examples, a two-finger right to left stroke can be defined as a word-level erase command. In some examples, an upward single or double stroke can be defined as changing the case of the last letter or word typed to be upper case, depending on whether or not a space has been entered. Furthermore, if the stroke gesture has circular curvature, the case of the last letter or word can cycle through all legitimate cases of the letter or word until the user stops this action.

In some implementations, the finger differentiation method can be modified by changing the finger contact differentiation into character key image differentiation. Many of the character estimation steps are similar, except that each character key can be associated with an image model or a set of image models. These models can be similarly updated according to the previous finger contact images 202a-202e, 204a-204e on the recognized and uncorrected characters. The angle at which a finger contacts a key can be referred to as the strike angle. Because the strike angle of the same finger can vary from key to key, this approach can be slightly more accurate and more discriminating in detecting which key the user intends to type.

In some implementations, word-specific rhythm models (i.e., temporal patterns) can be used as additional information for error correction. In some examples, a word-specific rhythm model can be based on time durations ($T_i$) between entering consecutive letters i and i+1 in a word and a total duration of entering the word. For example, a word-specific rhythm model can be based on $\{T_1/T_w, T_2/T_w, \ldots, T_m/T_w\}$, where m is the total number of letters in the word. In some implementations, the statistical keyboard geometry model can be changed dynamically. In some implementations, a high-dimensional feature space composite model can be used to estimate a character output. For example, a high-dimensional composite vector can include both finger contact image locations and character conditional probabilities.

Figure 3:
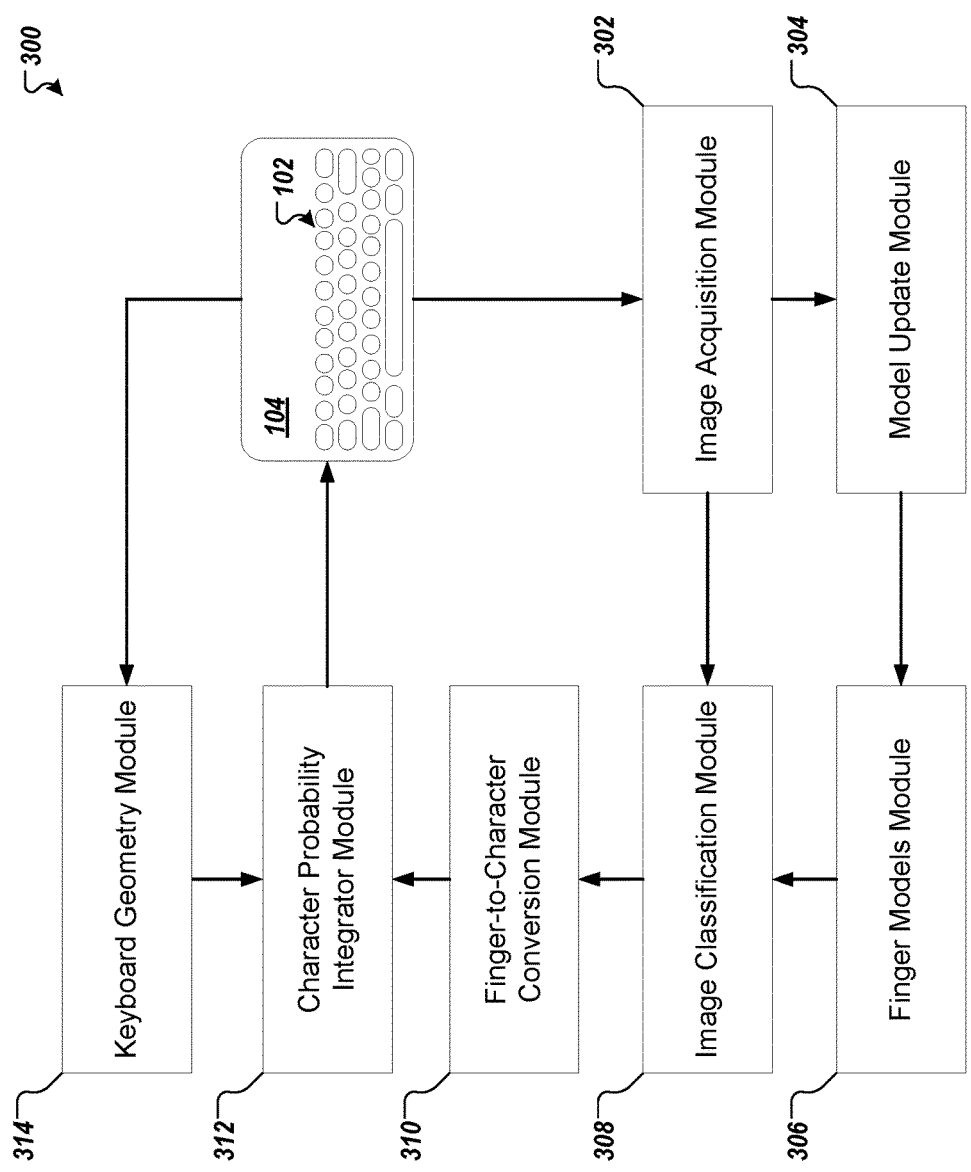
FIG. 3 depicts example modules that can be implemented in accordance with the present disclosure.

FIG. 3 depicts example modules 300 that can be implemented in accordance with the present disclosure. In some implementations, an example system such as system 100 can include an image acquisition module 302, a model updater module 304, a finger models module 306, an image classification module 308, a finger-to-character conversion module 310, a character probability integrator module 312, and a keyboard geometry module 314. In some examples, each module can be provided as one or more software modules and/or sub-modules that can be executed on a computing device (e.g., computing device 100 of FIG. 1).

In some implementations, the image acquisition module 302 is operable to generate one or more of finger contact images 202a-202e, 204a-204e upon receiving one or more finger contacts from one or more of fingers 1-10 from a user. In some examples, the image acquisition module 302 can be configured to use one or more of various touch sensing technologies to generate the finger contact images 202a-202e, 204a-204e, including resistive sensing, SAW technology, capacitive sensing, infrared sensing, and optical sensing. In some examples, the image acquisition module 302 can output the finger contact images 202a-202e, 204a-204e to one or both of the model updater module 304 and the image classification module 308.

In some implementations, the model updater module 304 is operable to receive one or more finger contact images 202a-202e, 204a-204e from the image acquisition module 302 and use the images 202a-202e, 204a-204e to update the finger models. In some examples, the model updater module 304 can assign a weight to one or more of the received images 202a-202e, 204a-204e and use the one or more weighted images to update the finger models.

In some examples, the model updater module 304 can apply a set of exception rules to one or more of the received finger contact images 202a-202e, 204a-204e before updating the finger models. For example, if a new finger contact image 202a-202e, 204a-204e is very different from the images 202a-202e, 204a-204e included within the current finger models, then the model updater module 304 can place the new image 202a-202e, 204a-204e on hold until it receives several additional images 202a-202e, 204a-204e that are sufficiently similar to the new image 202a-202e, 204a-204e and to one another. If the new finger contact images 202a-202e, 204a-204e are not similar to one another, then the model updater module 304 can discard these images 202a-202e, 204a-204e. If the new images 202a-202e, 204a-

204*e* are similar to one another, then the model updater module 304 use these images 202*a*-202*e*, 204*a*-204*e* to update the finger models.

In some examples, the model updater module 304 can compare a new finger contact image 202*a*-202*e*, 204*a*-204*e* to a set of sub-models within a queue. The model updater module 304 can assign a total similarity score to the new image 202*a*-202*e*, 204*a*-204*e* and use the scored image 202*a*-202*e*, 204*a*-204*e* to update the associated finger model.

In some examples, the model updater module 304 can provide the received finger contact images 202*a*-202*e*, 204*a*-204*e* to the finger models module 306 without assigning any weight to the images or applying a set of exception rules to the images. In some examples, the model updater module 304 can use the received finger contact images 202*a*-202*e*, 204*a*-204*e* to update the finger models without assigning any weight or score to the images or applying a set of exception rules to the images. In some examples, the model updater module 304 can use a subset of finger contact images 202*a*-202*e*, 204*a*-204*e* to update the finger models.

In some implementations, once the model updater module 304 updates the finger models, it can provide the updated models to the finger models module. In some examples, the model updater module 304 can vary the frequency with which it updates the finger models.

In some implementations, the finger models module 306 is operable to receive one or more finger contact images 202*a*-202*e*, 204*a*-204*e* from the model updater module 304 during a finger registration process. During the finger registration process, a user can rest one or more fingers on the touchscreen 104, and the image acquisition module 302 can generate one or more respective finger contact images 202*a*-202*e*, 204*a*-204*e*. The image acquisition module 302 can provide the images 202*a*-202*e*, 204*a*-204*e* to the model updater module 304, and the model updater module 304 can provide the images 202*a*-202*e*, 204*a*-204*e* to the finger models module 306. The finger models module 306 can use the images 202*a*-202*e*, 204*a*-204*e* to generate one or more new finger models.

In some implementations, a registration process is not used, and the finger models module 306 can generate one or more new finger models without using finger contact images 202*a*-202*e*, 204*a*-204*e*. In some examples, the finger models module 306 can initialize the one or more new finger models with neutral values and flag these models so that the next series of images 202*a*-202*e*, 204*a*-204*e* can be used for model generation (until all 10 finger models have been generated).

In some implementations, the finger models module 306 is operable to receive one or more updated finger models from the model updater module 304. In some examples, the finger models module 306 can discard previous versions of the respective updated finger models. In some implementations, the finger models module 306 is operable to instruct the computing device 100 to store the finger models.

In some implementations, the image classification module 308 can receive one or more finger contact images 202*a*-202*e*, 204*a*-204*e* from the image acquisition module 302 and one or more finger models from the finger models module 306. In some examples, the image classification module 308 can compute a set of finger probabilities by comparing the finger contact images 202*a*-202*e*, 204*a*-204*e* to the finger models using image-based classification schemes such as Raw Image Matching, Core Image Matching, and Finger Code Matching. In some examples, the image classification module 308 can compute a set of finger probabilities by comparing the finger contact images 202*a*-202*e*, 204*a*-204*e* to the finger models using feature-based classification schemes that use features such as the area, orientation, and contour shape of the images 202*a*-202*e*, 204*a*-204*e* in order to distinguish one finger from another finger. Once the image classification module 308 computes a set of finger probabilities, then the image classification module 308 can provide the set to the finger-to-character conversion module 310.

In some implementations, the finger-to-character conversion module 310 can receive a set of finger probabilities from the image classification module 308 and generate a finger-to-character conversion matrix. In some examples, the finger-to-character conversion module 310 can initialize the matrix and calculate the matrix assuming a standard finger assignment on a QWERTY keyboard layout. In some examples, the finger-to-character conversion module 310 can initialize the matrix and calculate the matrix assuming a uniform assignment, for which there is no assumption of finger assignment to particular keys. In some examples, the finger-to-character conversion module 310 can update the matrix continuously as each character is entered and uncorrected for a given finger determination. In some implementations, the finger-to-character conversion module 310 can provide the calculated finger-to-character conversion matrix and the set of finger probabilities to the character probability integrator module 312.

In some implementations, the character probability integrator module 312 can receive a finger-to-character conversion matrix and a set of finger probabilities from the finger-to-character conversion module 310. In some examples, the character probability integrator module 312 can receive a statistical keyboard geometry model from the keyboard geometry model module 314 and compute a set of character probabilities based on this model. In some implementations, the character probability integrator module 312 can estimate the probability of each character being the target character by using the received finger-to-character conversion matrix and the received set of finger probabilities. In some implementations, the character probability integrator module 312 can further estimate the probability of each character being the target character by using the set of character probabilities based on the statistical keyboard geometry model. Thus, the character probability integrator module 312 can compute a final set of estimated character probabilities based on one or more of the finger-to-character conversion matrix and the set of finger probabilities and the set of character probabilities based on the statistical keyboard geometry model. Based on the final set of estimated character probabilities, the character probability integrator module 312 can select a character with the highest probability and provide this character to the computing device 100, which can display the selected character on the touchscreen 104. In some implementations, the character probability integrator module 312 can update the statistical keyboard geometry model by associating the provided character with the finger contact image 202*a*-202*e*, 204*a*-204*e* and providing this information to the computing device 100.

In some implementations, the keyboard geometry model module 314 can receive a statistical keyboard geometry model from the computing device 100. In some examples, the keyboard geometry model module 314 can provide the statistical keyboard geometry model to the character probability integrator module 312.

Figure 4:
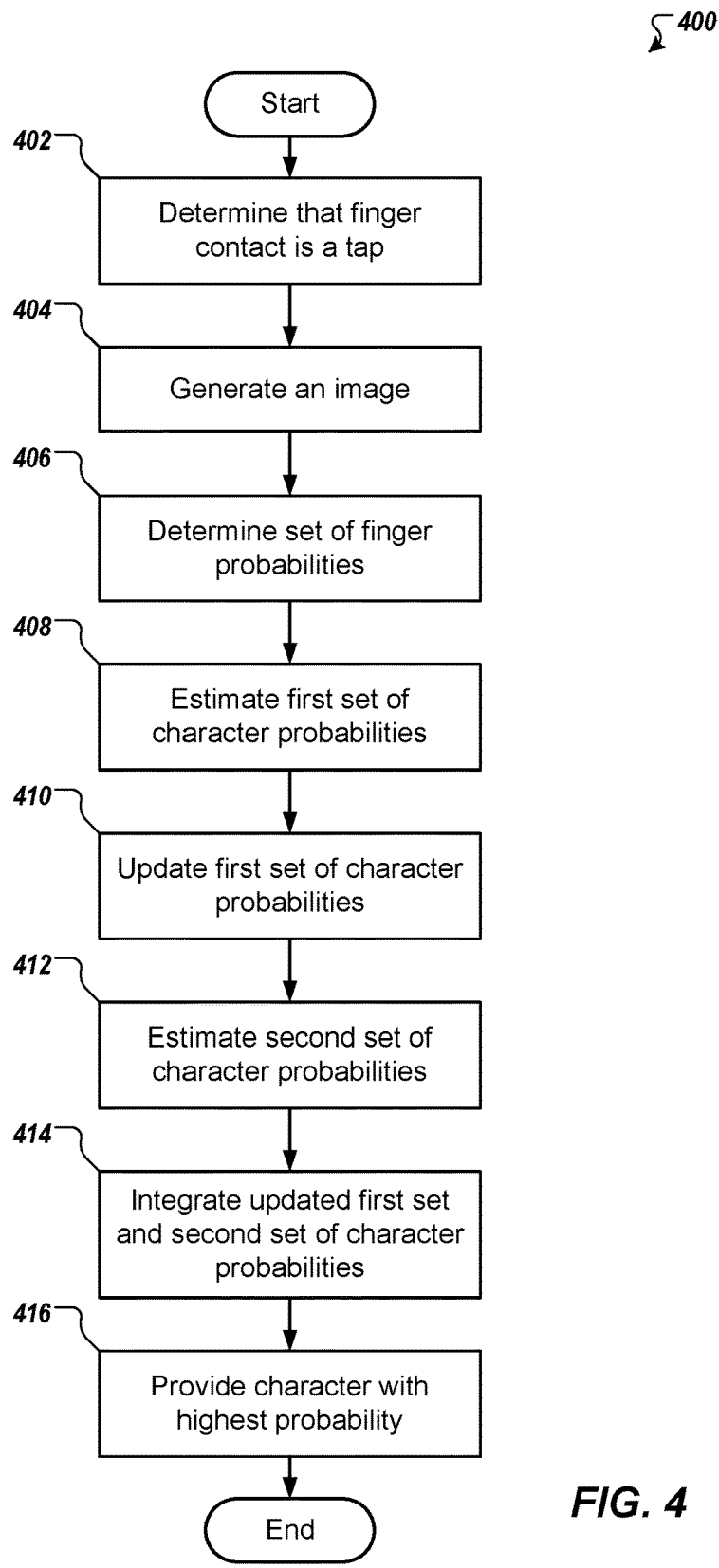
FIG. 4 depicts an example process that can be executed in implementations of the present disclosure.

FIG. 4 depicts an example process 400 that can be executed in implementations of the present disclosure. The example process 400 can be executed using a computing device. For example, the computing device 100 of FIG. 1 can be used to execute the example process 400.

When a user contacts the touchscreen keyboard 102 with one of their fingers and subsequently lifts the finger, the computing device 100 can determine that the contact is a tap (402), and the image acquisition module 302 can generate a finger contact image 202a-202e, 204a-204e (404). Based on the location of the image 202a-202e, 204a-204e on the touchscreen and the current finger models, the image classification module 308 can estimate a set of finger probabilities (406). The finger-to-character conversion module 310 can estimate a first set of character probabilities (i.e., a finger-to-character conversion matrix) (408). The first set of character probabilities can be based on the location of the finger contact image 202a-202e, 204a-204e. In some examples, the character probability integrator 312 can update the first set of character probabilities (410) using the set of finger probabilities, providing an updated set of character probabilities. In some examples, the character probability integrator 312 can further estimate a second set of character probabilities (412) based on a statistical keyboard geometry model. The second set can be integrated with the updated set to estimate a final set of character probabilities (414). Based on the final set of character probabilities, the character probability integrator module 312 can determine the character with the highest probability and provide this character to the touchscreen 104 (416).

In some examples, the character probability integrator module 312 can recognize that the provided character is the Backspace character. In some implementations, the character probability integrator module 312 can recognize that the provided character is not the Backspace character, and the module 312 can update the statistical keyboard geometry model by associating the provided character with the finger contact image 202a-202e, 204a-204e. In some examples, the model updater module 304 can update the current finger models.

In some implementations, when a user contacts the touchscreen keyboard 102 with one of their fingers and subsequently lifts the finger, the computing device 100 can determine that the contact is a stroke gesture. In some examples, the stroke gesture can correspond to the erase command, and the computing device 100 can provide the erase command to and execute the erase command on the touchscreen 104. In some examples, when the erase command is executed, the finger models are not updated based on the finger contact image 202a-202e, 204a-204e generated by the previous finger contact. In some examples, the stroke gesture can correspond to a different gesture (e.g., a letter case change), which can also be provided to and executed on the touchscreen 104.

Figure 5:
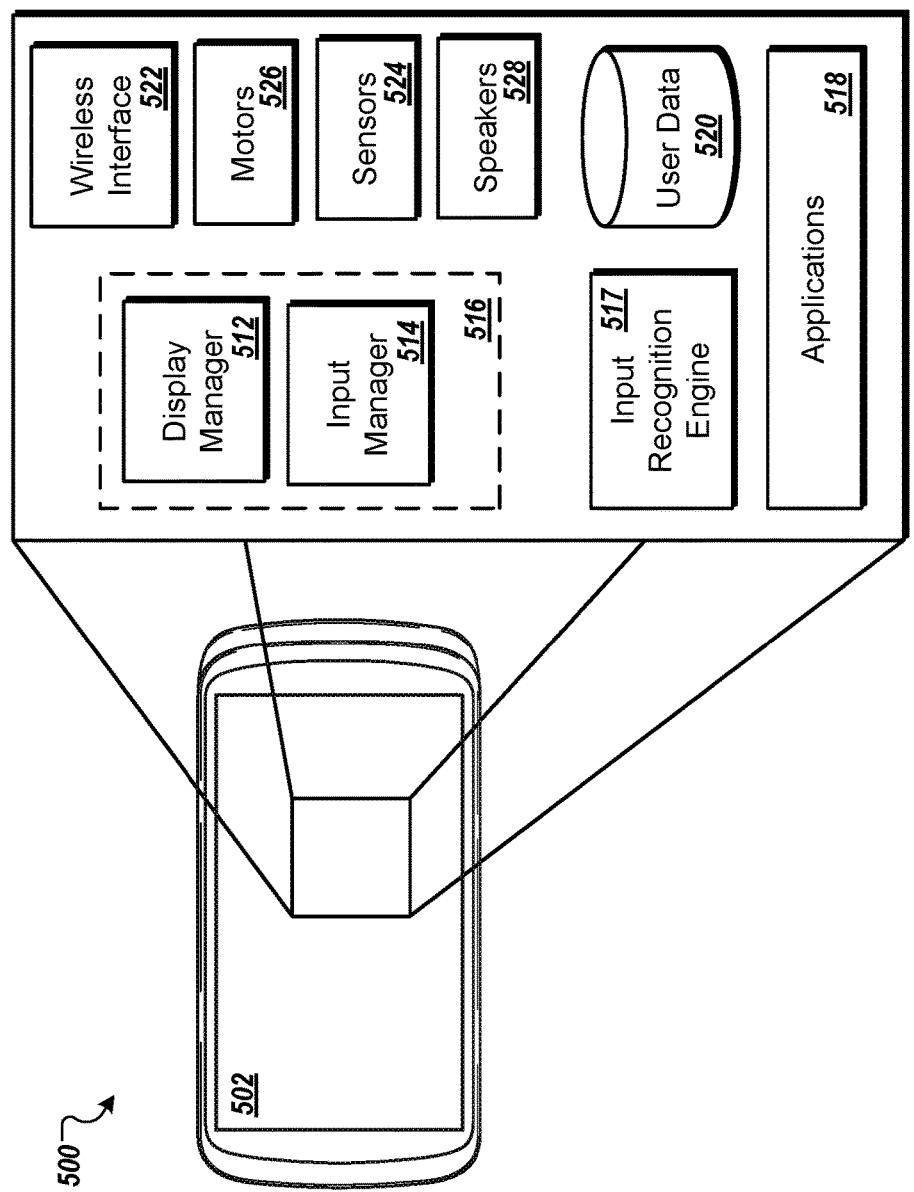
FIG. 5 is a block diagram depicting example components of an example computing device.

FIG. 5 is a block diagram depicting example components of an example computing device 500. In general, the example computing device 500 is provided as a tablet computing device that includes a touchscreen 502 that can be used as a user interface for the tablet computing device 500. In some implementations, however, the computing device 500 can be a desktop computer including a touchscreen, a laptop computer including a touchscreen, a personal digital assistant (PDA), a mobile phone including a touchscreen, an interactive wall, an interactive table, or one of many other types of computing devices including a touchscreen. A number of components within the tablet computing device 500 provide for interaction with the tablet computing device 500. For purposes of clarity, FIG. 5 shows certain example components of the tablet computing device 500. The tablet computing device 500 can communicate with a server through a network (e.g., the internet) using a wireless interface 522.

A number of components running on one or more processors included in the tablet computing device 500 enable a user to interact with the touchscreen 502 to provide input and to receive visual output. For example, an interface manager 516 can manage interaction with the touchscreen 104 and includes a display manager 512 and an input manager 514.

The display manager 512 can manage the information displayed to a user using the touchscreen 502. For example, an operating system running on the tablet computing device 500 can use the display manager 512 to arbitrate access to the touchscreen 502 for a number of applications 518 running on the tablet computing device 500. For example, the tablet computing device 500 can display a number of applications, each in its own window on the touchscreen 502, and the display manager 512 can control which portions of each application are shown on the touchscreen 502. In some examples, the display manager 512 can control the orientation (i.e., portrait orientation or landscape orientation) of the touchscreen 502. In some examples, the display manager 512 can control the layout of the touchscreen keyboard (i.e., Qwerty layout or non-QWERTY layout).

The input manager 514 can control the handling of data received from a user using the touchscreen 502 or other input mechanisms. For example, the input manager 514 can coordinate with the input recognition engine 517 to identify where, on the touchscreen 502, a user is contacting the touchscreen 502 so that that the tablet computing device 500 may assign the contact to a particular touchscreen character key. In addition, the input recognition engine 517 may determine which module should be invoked as a result of the input. For example, input to the tablet computing device 500 using the touchscreen 502 can be a user contacting the touchscreen 502 while typing. The contact trajectory of the user's finger can determine which of the modules 300 should be accessed as described with reference to FIG. 3 and FIG. 4. In some cases, the input recognition engine 517 can determine the area of the tablet computing device 500 touched by the user's finger, and from this determination, further determine which of the functions of an application running on the tablet computing device 500 is invoked and controlled by the user.

One or more sensors 524 can sense the movement of the tablet computing device 500. Example sensors 524 can include one or more accelerometers, a gyroscope and a compass. The tablet computing device 500 can determine a direction and speed of movement using signals generated by the one or more sensors 524.

The tablet computing device 500 can provide visual, haptic and audio feedback as the user interacts with the computing device 500. The tablet computing device 500 can provide visual feedback using the display manager 512 to display a virtual artifact on the touchscreen display 104. The tablet computing device 500 can provide audio feedback using one or more processors installed in the tablet computing device 500 to generate audio tones (e.g., beeps, clicks) for audio output on one or more speakers 528. The tablet computing device 500 can provide audio feedback using the one or more processors installed in the tablet computing device 500 to generate spoken words for output on the one or more speakers 528. The spoken words can be based on a selected item or action by a user manipulating the tablet computing device 500 while controlling a virtual artifact to select the item or action. The tablet computing device 500 can provide haptic feedback by driving one or more motors 526 in order to vibrate the tablet computing device 500.

A user data database 520 may store information about particular user preferences or parameters. In some examples, the database 520 can store one or more finger models generated by the finger models module 306 or updated by the model updater module 304. In some examples, the database 520 can store one or more statistical keyboard geometry models that can be provided to the keyboard geometry model module 314.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a touchscreen, for displaying information and for providing input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method, comprising:
displaying, on a touchscreen of a computing device, a plurality of virtual keys;
receiving, by the computing device, a contact with the touchscreen while the plurality of virtual keys were displayed on the touchscreen, wherein the contact was with a contacted area of the touchscreen, the contacted area of the touchscreen being a portion of the touchscreen at which the computing device displayed multiple candidate virtual keys of the plurality of virtual keys;
determining, by the computing device and based on an electrical or optical change to the touchscreen that results from the contact, a contact image that depicts the contacted area of the touchscreen;
determining, by the computing device, a particular finger that provided the contact with the contacted area of the touchscreen from among multiple fingers of a same user hand, based on analysis of the contact image with multiple pre-defined contact images that model touchscreen contacts by different, respective user fingers of the same user hand;
selecting, by the computing device, a particular virtual key, of the multiple candidate virtual keys displayed at the contacted area of the touchscreen, to assign to the contact with the touchscreen, the particular virtual key being selected from among the multiple candidate virtual keys, based on:
(i) a location of the contacted area of the touchscreen, and
(ii) the computing device having determined that the particular finger provided the contact with the touchscreen in distinction to another one of the multiple fingers of the same user hand, based on the analysis of the contact image; and
performing, by the computing device in response to the computing device selecting the particular virtual key of the multiple candidate virtual keys to assign to the contact with the touchscreen, an action that corresponds to user selection of the particular virtual key.

2. A computer-implemented method, comprising:
displaying, on a touchscreen of a computing device, a plurality of virtual keys, wherein each of the plurality of virtual keys (i) corresponds to a different character of a plurality of characters and (ii) is displayed at a particular location on the touchscreen that is different from the locations at which any other virtual key of the plurality of virtual keys is displayed on the touchscreen;
receiving, by the computing device, a contact with the touchscreen while the plurality of virtual keys are displayed on the touchscreen, wherein the contact is with a contacted area of the touchscreen, the contacted area of the touchscreen being a portion of the touchscreen at which the computing device displayed multiple candidate virtual keys of the plurality of virtual keys;
determining, by the computing device, a characteristic of the contacted area of the touchscreen that resulted from the contact with the touchscreen;
determining, by the computing device, a particular finger that provided the contact with the contacted area of the touchscreen from among multiple fingers of a same user hand, based on analysis of the contact image with multiple pre-defined contact images that model the touchscreen contacts by different, respective fingers of the same user hand;
selecting, by the computing device, a particular virtual key of the multiple candidate virtual keys associated with the contacted area of the touchscreen, to assign to the contact with the touchscreen, the particular virtual key being selected from among the multiple candidate virtual keys, based on:
(i) a location of the contacted area of the touchscreen
(ii) the computing device having determined the characteristic of the contacted area of the touchscreen that resulted from the contact with the touchscreen; and
(iii) the computing device having determined that the particular finger provided the contact with the touchscreen in distinction to another one of the multiple fingers from the same user hand, based on the analysis of the contact image; and
performing, by the computing device, in response to the computing device selecting the particular virtual key of the multiple candidate virtual keys to assign to the contact with the touchscreen, an action that corresponds to user selection of the particular virtual key.

3. The computer-implemented method of claim 2, wherein selecting the particular virtual key of the multiple candidate virtual keys to assign to the contact with the touchscreen comprises:
determining a set of finger probabilities based on the characteristic of the contacted area of the touchscreen, wherein each finger probability of the set of finger probabilities (i) corresponds to a different user finger of the plurality of user fingers of the same user hand and (ii) indicates a respective likelihood that the contact with the touchscreen was performed by the particular user finger that corresponds to the finger probability; and
identifying conversion data that indicates, for each user finger of the plurality of user fingers of the same user hand, a respective set of character probabilities, wherein each respective set of character probabilities indicates a respective likelihood that the user finger would be used to target a particular character that corresponds to a respective character probability.

4. The computer-implemented method of claim 3, wherein selecting the particular virtual key from the multiple candidate virtual keys to assign to the contact with the touchscreen comprises selecting the particular virtual key from among the multiple candidate virtual keys using the set of finger probabilities, the conversion data, and the location of the touchscreen at which the contact with the touchscreen occurred.

5. The computer-implemented method of claim 1, wherein selecting the particular virtual key from the multiple candidate virtual keys to assign to the contact with the touchscreen comprises comparing a characteristic of the contacted area of the touchscreen with pre-defined characteristics of contacted areas for one or more user fingers of the plurality of user fingers of the same user hand.

6. The computer-implemented method of claim 5, further comprising updating the pre-defined characteristics of contacted areas for one or more user fingers of the plurality of user fingers of the same user hand based on the determined characteristic of the contacted area of the touchscreen.

7. The computer-implemented method of claim 1, wherein performing, by the computing device in response to the computing device selecting the particular virtual key to assign to the contact with the touchscreen, the action that corresponds to user selection of the particular virtual key comprises typing in a user interface displayed on the touchscreen of the computing device a particular character assigned to the particular virtual key.

8. The computer-implemented method of claim 1, wherein determining, by the computing device, the particular finger that provided the contact with the touchscreen from among multiple fingers of the same user hand, based on analysis of the contact image to multiple pre-defined contact images that model touchscreen contacts by different, respective user fingers of the same user hand, includes comparing a shape of the contact image to one or more shapes of the multiple pre-defined contact images.

9. A non-transitory computer-readable medium having instructions stored thereon that, when executed by one or more processors of a computing device, cause the one or more processors to perform operations comprising:
   displaying, on a touchscreen of a computing device, a plurality of virtual keys;
   receiving, by the computing device, a contact with the touchscreen while the plurality of virtual keys were displayed on the touchscreen, wherein the contact was with a contacted area of the touchscreen, the contacted area of the touchscreen being a portion of the touchscreen at which the computing device displayed candidate virtual keys of the plurality of virtual keys;
   determining, by the computing device and based on an electrical or optical change to the touchscreen that results from the contact, a contact image that depicts the contacted area of the touchscreen;
   determining, by the computing device, a particular finger that provided the contact with the touchscreen from among multiple fingers of a same user hand, based on analysis of the contact image to multiple pre-defined contact images that model touchscreen contacts by different, respective user fingers from the same user hand;
   selecting, by the computing device, a particular virtual key of the multiple candidate virtual keys associated with the contact area of the touchscreen, to assign to the contact with the touchscreen, the particular virtual key being selected from among the multiple candidate virtual keys, based on:
      (i) a location of the contacted area of the touchscreen, and
      (ii) the computing device having determined that the particular finger provided the contact with the touchscreen in distinction to another one of the multiple fingers of the same user hand providing the contact with the touchscreen, based on the analysis of the contact image; and
   performing, by the computing device in response to the computing device selecting the particular virtual key of the multiple candidate virtual keys to assign to the contact with the touchscreen, an action that corresponds to user selection of the particular virtual key.

10. The computer-readable medium of claim 9, wherein selecting the particular virtual key, of the multiple candidate virtual keys associated with the contacted area of the touchscreen, to assign to the contact with the touchscreen comprises:
   determining, based on a characteristic of the contacted area of the touchscreen, a particular user finger, from among multiple fingers of a same user hand, that provided the contact with the touchscreen; and
   selecting the particular key, from among the multiple fingers of the same user hand, to assign to the contact with the touchscreen based at least on the particular user finger from among the multiple fingers of the same user hand that provided the contact with the touchscreen.

11. The computer-readable medium of claim 9, wherein each of the plurality of virtual keys (i) corresponds to a different character of a plurality of characters and (ii) is displayed at a particular location on the touchscreen that is different from the locations at which any other virtual key of the plurality of virtual keys is displayed on the touchscreen.

12. The computer-readable medium of claim 11, wherein selecting the particular virtual key of the multiple candidate virtual keys to assign to the contact with the touchscreen comprises:
   determining a set of finger probabilities based on the comparison of the contact image to the one or more pre-defined images that respectively model touchscreen contact by different user fingers, wherein each finger probability of the set of finger probabilities (i) corresponds to a different user finger of a plurality of user fingers of a same user hand and (ii) indicates a respective likelihood that the contact with the touchscreen was performed by the particular user finger that corresponds to the finger probability; and
   identifying conversion data that indicates, for each user finger of the plurality of user fingers of the same user hand, a respective set of character probabilities, wherein each respective set of character probabilities indicates a respective likelihood that the user finger would be used to target a particular character that corresponds to a character probability.

13. The computer-readable medium of claim 12, wherein selecting the particular virtual key from the multiple candidate virtual keys to assign to the contact with the touchscreen comprises selecting the particular virtual key from among the multiple candidate virtual keys using the set of finger probabilities, the conversion data, and the location of the touchscreen at which the contact with the touchscreen occurred.

14. The computer-readable medium of claim 9, wherein selecting the particular virtual key from among multiple candidate virtual keys to assign to the contact with the touchscreen comprises comparing a characteristic of the contacted area of the touchscreen with pre-defined characteristics of contacted areas for one or more user fingers of the plurality of user fingers of the same user hand.

15. The computer-readable medium of claim 14, wherein the operations further comprise updating the pre-defined characteristics of contacted areas for one or more user fingers of the plurality of user fingers of the same user hand based on the determined characteristic of the contacted area of the touchscreen.

16. The computer-readable medium of claim 9, wherein performing, by the computing device in response to the computing device selecting the particular virtual key to assign to the contact with the touchscreen, the action that corresponds to user selection of the particular virtual key comprises typing in a user interface displayed on the touchscreen of the computing device a particular character assigned to the particular virtual key.

17. The computer-readable medium of claim 9, wherein determining, by the computing device, the particular finger that provided the contact with the touchscreen from among multiple fingers of the same user hand, based on analysis of the contact image to multiple pre-defined contact images that model touchscreen contacts by different, respective user fingers of the same user hand, includes comparing a shape of the contact image to one or more shapes of the multiple pre-defined contact images.

18. The computer-implemented method of claim 1, wherein the contact image indicates variation in a characteristic of the contact that occurred in an interior portion of the contacted area of the touchscreen, the contacted area of the touchscreen being the portion of the touchscreen at which the computing device displayed multiple candidate virtual keys of the plurality of virtual keys.

\* \* \* \* \*

UNITED STATES PATENT AND TRADEMARK OFFICE
CERTIFICATE OF CORRECTION

PATENT NO. : 10,372,328 B2  
APPLICATION NO. : 15/268928  
DATED : August 6, 2019  
INVENTOR(S) : Zhai Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 71 days.

Signed and Sealed this  
Second Day of June, 2020

Andrei Iancu  
*Director of the United States Patent and Trademark Office*